(12) United States Patent
Huang (10) Patent No.: US 7,185,676 B2
(45) Date of Patent: Mar. 6, 2007

(54) VALVE STRUCTURE FOR FAUCETS

(76) Inventor: Ching Yu Huang, No. 22, Lane 115, Sec. 1, Youyuan Rd., Dadu Township, Taichung County 432 (TW)

( * ) Notice: Subject to any disclaimer, the term of this patent is extended or adjusted under 35 U.S.C. 154(b) by 222 days.

(21) Appl. No.: 10/919,232

(22) Filed: Aug. 17, 2004

(65) Prior Publication Data

US 2006/0037650 A1  Feb. 23, 2006

(51) Int. Cl.
*F16K 11/074* (2006.01)
(52) U.S. Cl. ............... 137/625.4; 137/625.17; 137/636.3; 251/288
(58) Field of Classification Search .......... 625/625.17, 625/625.4, 625.41, 636.3, 454.2, 454.5, 454.6; 251/288
See application file for complete search history.

(56) References Cited

U.S. PATENT DOCUMENTS

| | | | |
|---|---|---|---|
| 2,740,130 A * | 4/1956 | Stone | 137/454.5 |
| 3,324,884 A * | 6/1967 | Dornaus | 137/625.17 |
| 4,657,045 A * | 4/1987 | Kitamura | 137/625.4 |
| 5,320,129 A * | 6/1994 | Bosio | 137/625.17 |
| 5,402,827 A * | 4/1995 | Gonzalez | 137/625.17 |
| 5,538,041 A * | 7/1996 | Ganzle | 137/625.17 |
| 5,609,188 A * | 3/1997 | Oberdorfer | 137/625.4 |
| 5,887,620 A * | 3/1999 | Niwa et al. | 137/625.4 |
| 6,321,789 B1 * | 11/2001 | Chen | 137/625.17 |
| 2004/0084097 A1 * | 5/2004 | Bloom et al. | 137/625.17 |

FOREIGN PATENT DOCUMENTS

| | | | |
|---|---|---|---|
| DE | 3716305 A1 * | 11/1988 | 137/625.4 |
| FR | 2590643 A1 * | 5/1987 | 137/625.4 |

* cited by examiner

*Primary Examiner*—John Rivell
(74) *Attorney, Agent, or Firm*—Egbert Law Offices (57) ABSTRACT

A faucet valve includes a chamber defined in an underside thereof and a fixed plate is fixed in the chamber and has a first flat surface and a second flat surface defined in two respective raised portions of the fixed plate. A groove is defined between the first and second flat surfaces so as to receive grease therein. A hot water inlet, a cold water inlet and an outlet are defined through the first flat surface. A movable plate is mounted on the fixed plate and has an adjusting recess defined in an underside thereof. The movable plate is driven by a control rod extending through the body.

8 Claims, 12 Drawing Sheets

VALVE STRUCTURE FOR FAUCETS

FIELD OF THE INVENTION

The present invention relates to a valve structure for faucets and includes larger groove for storing grease therein and a slightly larger force is required to turn the valve for hot water.

BACKGROUND OF THE INVENTION

Figure 14:
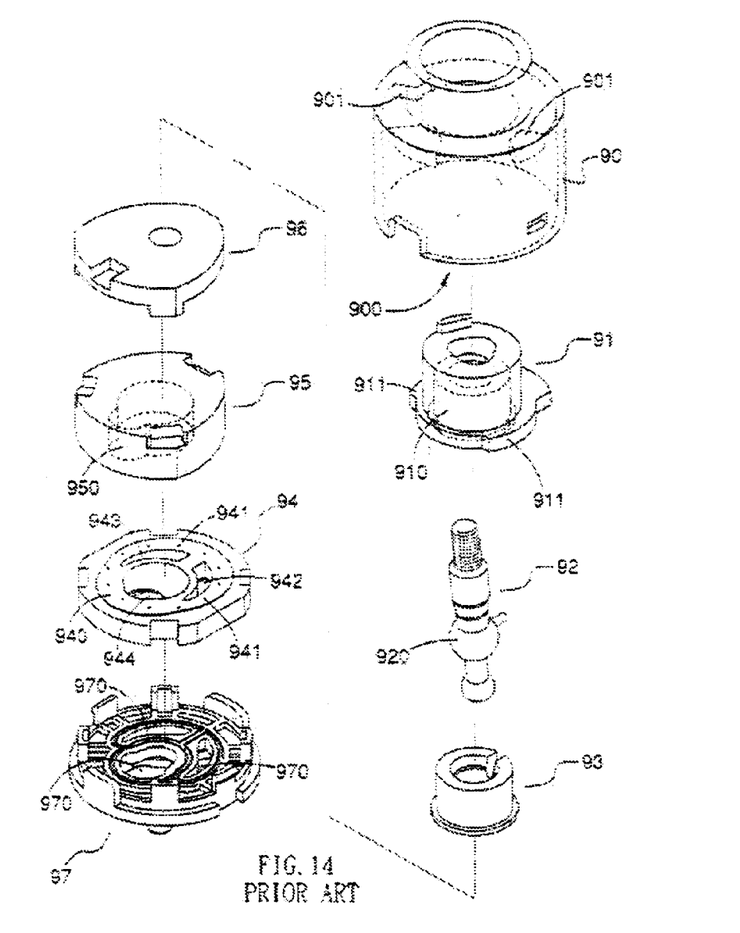
FIG. 14 is an exploded view to show a conventional faucet valve.
Figure 15:
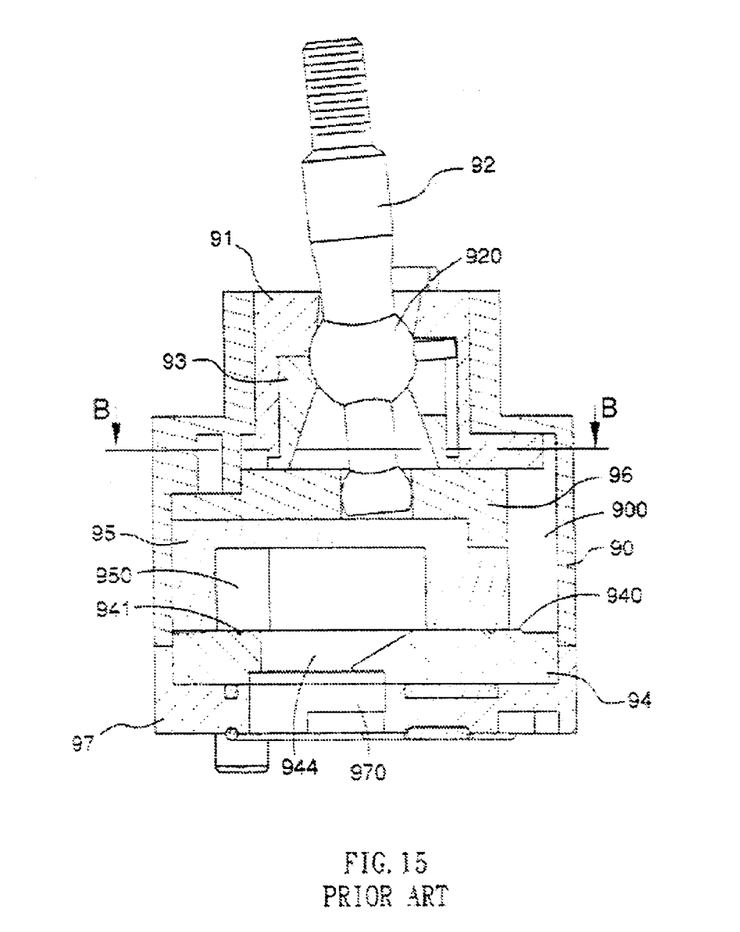
FIG. 15 is a cross sectional view to show the faucet valve of the present invention.
Figure 16:
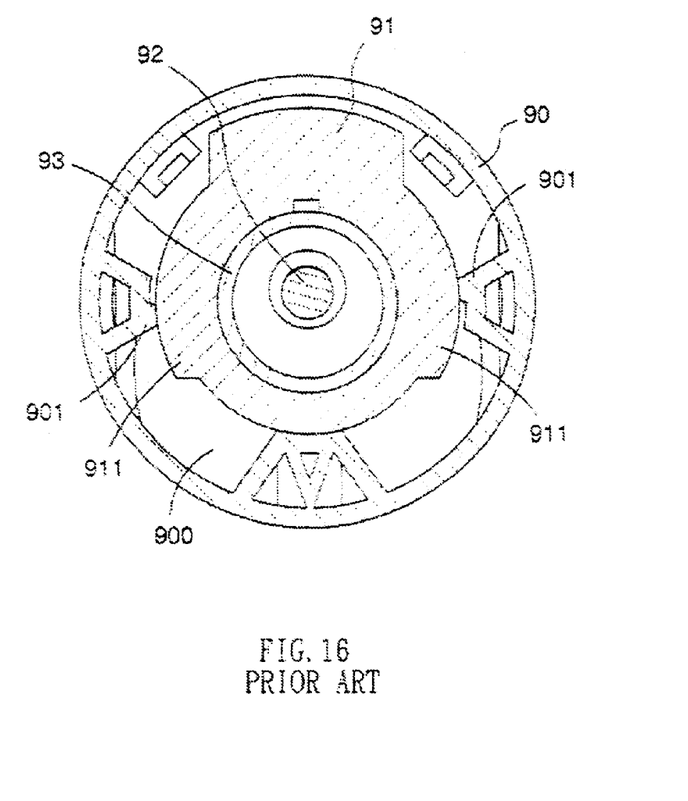
FIG. 16 is a cross sectional view along line B—B in FIG. 15.

A conventional valve for faucets is disclosed in FIG. 14 and generally includes a body 90 having a chamber 900 defined in an underside thereof and two stop members 901 extend inward from an inner periphery of the chamber 900. A frame 91 is received in the chamber 900 and a control rod 92 rotatably extends through the frame 91. A space 910 is defined in the frame 91 so as to receive a sphere 920 of the control rod 92. A bottom cap 93 has an open top in which a lower end of the control rod 92 is received. The frame 91 includes two wings 911 on an outer periphery thereof and the two stop members 901 in the body 90 limit the angle of the rotation of the frame 91 in the chamber 900. A bottom plate 97 is engaged with the open bottom of the chamber 900 of the body 90 and includes three through holes 970 defined therethrough. A fixed plate 94 is fixed in the chamber 900 and includes a first surface 940 through which a hot water inlet 942, a cold water inlet 943 and an outlet 944. A plurality of recesses 941 for receiving grease are defined in the surface 940. A movable plate 95 is disposed on the fixed plate 94 and has an adjusting recess 950 defined in an underside thereof. A driving plate 96 is engaged with the movable plate 95. The three through holes 970 are located corresponding to the hot water inlet 942, the cold water inlet 943 and the outlet 944.

Figure 17:
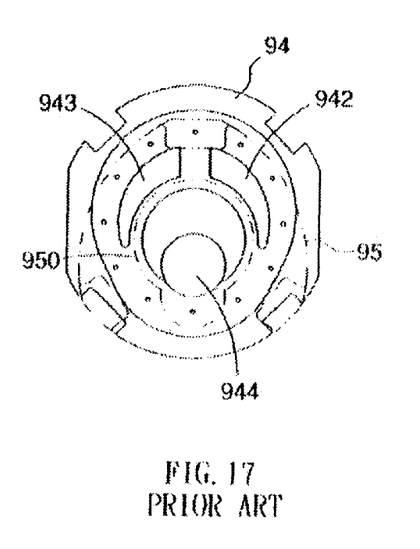
FIG. 17 shows that the conventional faucet is in "OFF" position.
Figure 18:
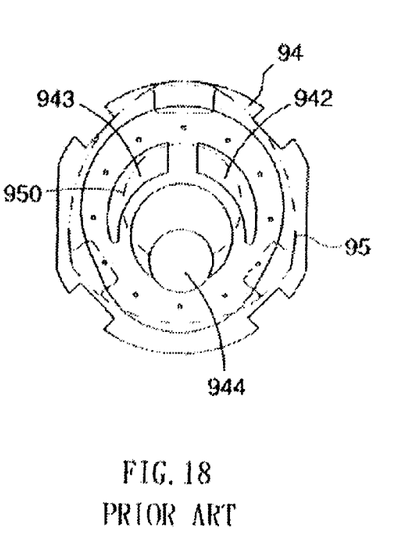
FIG. 18 shows that the conventional faucet is in a position where cold water and hot water are mixed.
Figure 19:
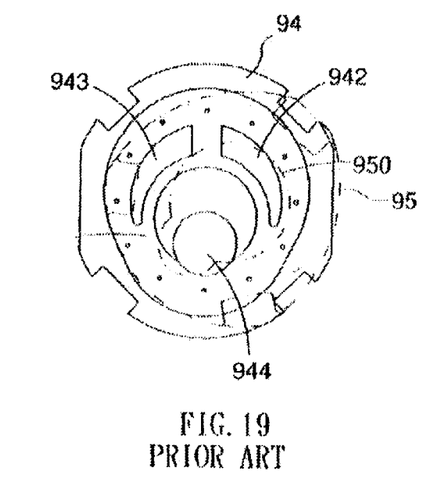
FIG. 19 shows that the conventional faucet is in a position where cold water is less than hot water.
Figure 20:
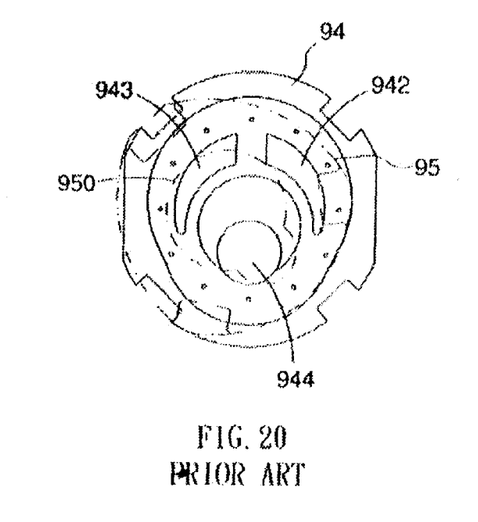
FIG. 20 shows that the conventional faucet is in a position where cold water is much more than hot water.

As shown in FIG. 17, when the movable plate 95 is moved to a lower position, the adjusting recess 950 is in communication with the outlet 944, and the hot water inlet 942 and the cold water inlet 943 are covered by the movable plate 95 such that the faucet is in an "OFF" position. As shown in FIG. 18, when the movable plate 95 is moved to an upper position, the adjusting recess 950 is in communication with the hot water inlet 942, the cold water inlet 943 and the outlet 944. The hot and cold water is mixed and come out from the outlet 944. As shown in FIG. 19, in the status disclosed in FIG. 18, when rotating the movable plate 95 clockwise, the area that the cold water inlet 943 is in communication with the adjusting recess 950 is reduced and the area that the hot water inlet 942 is in communication with the adjusting recess 950 is increased. The water coming out from the outlet 944 becomes warmer. On the contrary, as disclosed in FIG. 20, when rotating the movable plate 95 counter clockwise, the temperature of the water coming out from the outlet 944 is reduced.

Nevertheless, because the grease in the recesses 941 is so limited and the grease tends to be squeezed toward the periphery of the fixed plate 94 and lost, the lubrication problem happens within a short period of time. Besides, the flat surface 940 is defined in a raised area so that the movable plate 95 could lose its balance when rotating on the flat surface 940. Furthermore, children can easily operate the faucet to hot water position and get hurt.

The present invention intends to provide valve for faucets and improves all the shortcomings mentioned above for the conventional faucet valve.

SUMMARY OF THE INVENTION

The present invention relates to faucet valve which comprises a body having a chamber defined in an underside thereof and a control rod extends through the chamber and the body. A fixed plate is fixed in the chamber and has a first flat surface and a second flat surface, and a groove is defined between the first and second flat surfaces so as to receive grease therein. A hot water inlet, a cold water inlet and an outlet are defined through the first flat surface. A movable plate is mounted on the fixed plate and has an adjusting recess defined in an underside thereof. The movable plate is driven by the control rod.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
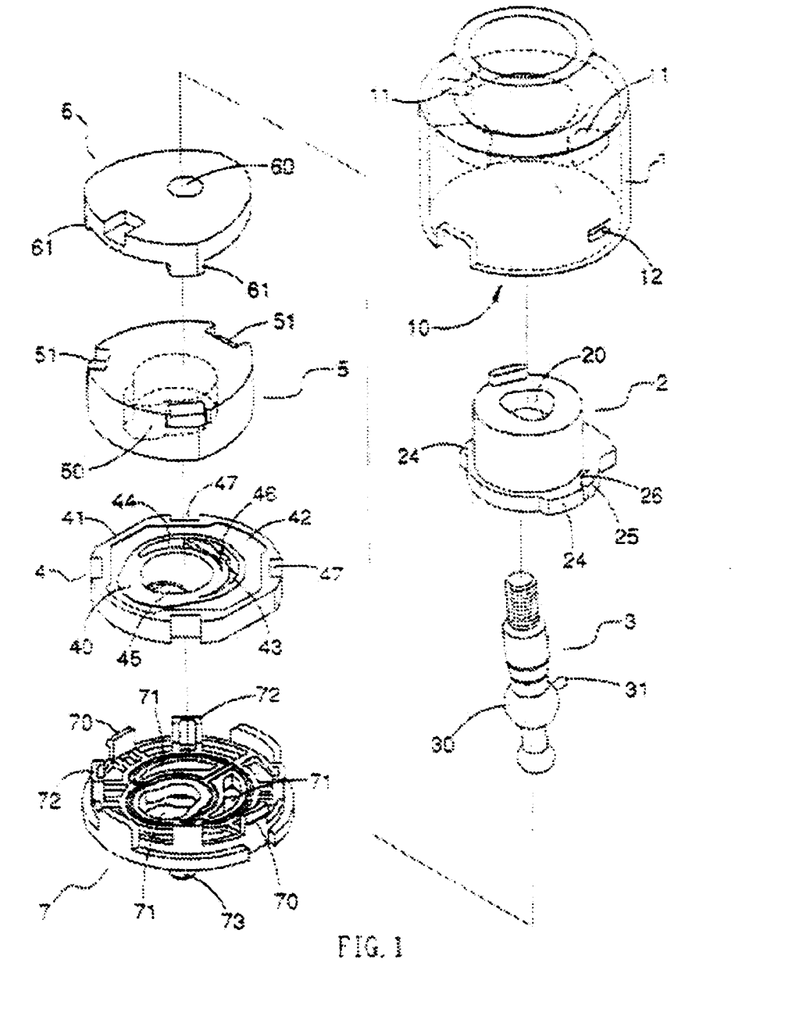
FIG. 1 is an exploded view to show the faucet valve of the present invention.
Figure 2:
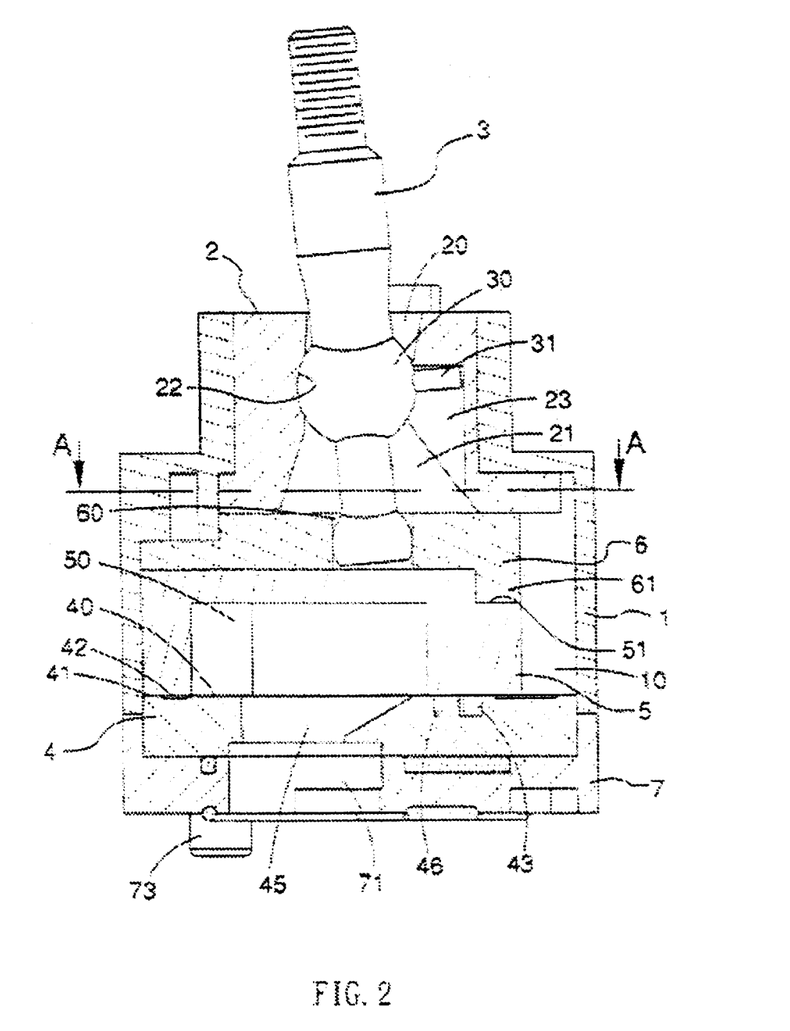
FIG. 2 is a cross sectional view to show the faucet valve of the present invention.
Figure 3:
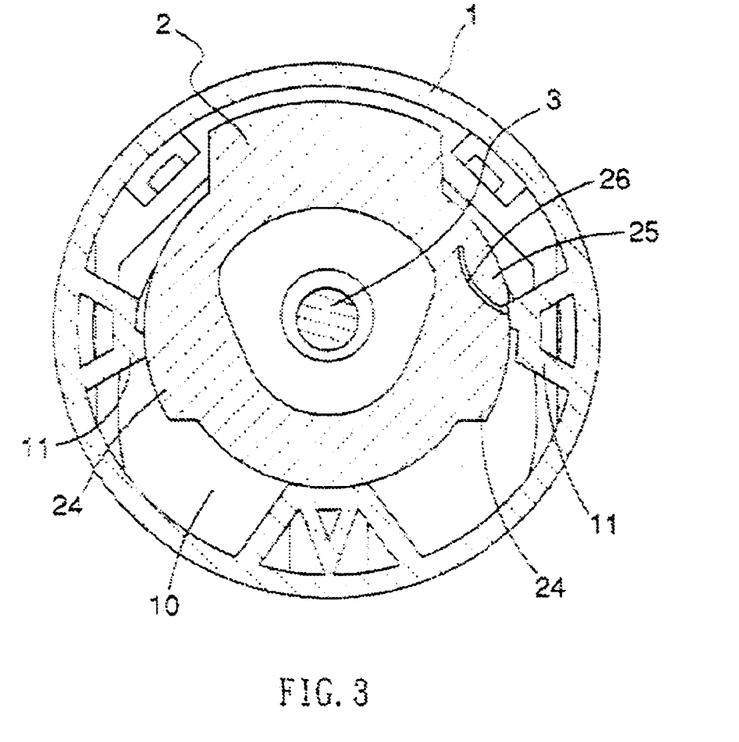
FIG. 3 is a cross sectional view along line A—A in FIG. 2.

Referring to FIGS. 1 to 3, the faucet valve of the present invention comprises a body 1 having a chamber 10 defined in an underside thereof and two stop members 11 extend inward from an inner periphery of the chamber 10. Two elongate slots 12 are defined through a wall of the body 1.

A frame 2 is rotatably received in the chamber 10 of the body 1 and includes a through hole 20 which has a sandglass-shaped inner periphery 21 and an annular and concave surface 22 is defined in a middle portion of the through hole 20. A control rod 3 includes a sphere portion 30 which is rotatably retained with the annular concave surface 22 and a top of the control rod 3 extends through a top of the body 1. A notch 23 is defined in the inner periphery of the through hole 20 and the control rod 3 has a bar 31 extending transversely therefrom which is engaged with the notch 23. The control rod 3 drives the frame 2 so as to rotate the frame 2 in the chamber 10. The frame 2 has two wings 24 extending from an outer periphery thereof, the two wings 24 alternatively contact the two stop members 11 when rotating the frame 2. By this way, the angle that the frame 2 is rotated can be limited. One of the wings 24 has a protrusion 25 connected thereto and a gap 26 is defined between the protrusion 25 and the wing 24 from which the protrusion 25 extends, such that the protrusion 25 can be pushed inward.

A fixed plate 4 is fixed in the chamber 10 and has a first flat surface 40 defined in a raised portion at a center of the fixed plate 40 and a second flat surface 41 defined in another raised portion at a periphery of the fixed plate 4 and flushed with the first flat surface 40. A groove 42 is defined between the first and second flat surfaces 40, 41 so as to receive grease therein. A hot water inlet 43, a cold water inlet 44 and an outlet 45 are respectively defined through the first flat surface 40. A slit 46 is defined in a separation portion between the hot water inlet 43 and the cold water inlet 44, wherein the slit 46 does not go through the separation portion and water does not leak downward from the slit 46. A bottom plate 7 is engaged with the chamber 10 in the body 1 and has three holes 71 defined therethrough which are in communication with the hot water inlet 43, the cold water inlet 44 and the outlet 45 respectively. Two hooks 70 extend from a top of the bottom plate 7 and are engaged with the elongate slots 12 of the body 1. A plurality of stubs 72 extend from the top of the bottom plate 7 and are engaged with recesses 47 defined in a periphery of the fixed plate 4. A plurality of positioning rods 73 extend from an underside of the bottom plate 7.

A movable plate 5 is mounted on the fixed plate 4 and has an adjusting recess 50 defined in an underside thereof. A driving plate 6 is mounted on the movable plate 5 and has a central hole 60 through which the control rod 3 extends. A plurality of clamping members 61 extend from an underside of the driving plate 6 and are engaged with engaging recesses 51 defined in the movable plate 5. By the arrangement, the movable plate 5 is driven by the control rod 3.

Figure 4:
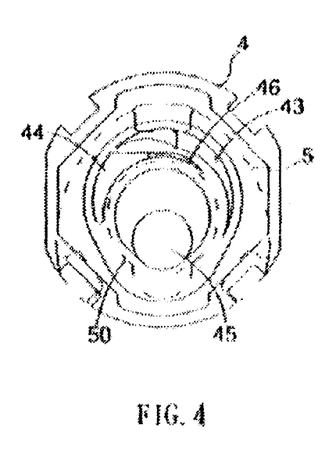
FIG. 4 shows that the faucet is in "OFF" position.
Figure 5:
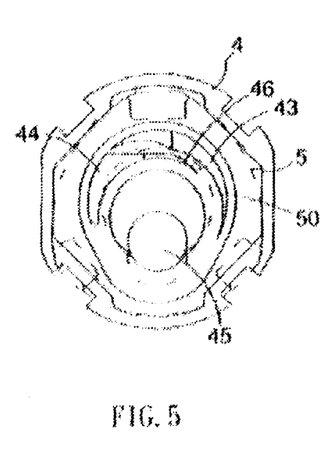
FIG. 5 shows that the faucet is in a position where cold water in a small amount is allowed to flow out from the outlet.

As shown in FIG. 4, when the movable plate 5 is moved a lower position of the fixed plate 4, the hot water inlet 43 and the cold water inlet 44 are covered by the movable plate 5 and the adjusting recess 50 is in communication with the outlet 45. The faucet is in "OFF" position. As shown in FIG. 5, when moving the movable plate 5 upward a distance, the adjusting recess 50 is in communication with the slit 46 and the outlet 45, the hot water inlet 43 is covered by the movable plate 5 so that only small amount of cold water is allowed to flow out from the outlet 45 via the slit 46 and this small amount of water is sufficient for washing hands.

Figure 6:
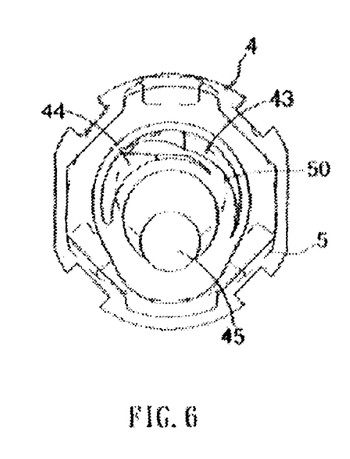
FIG. 6 shows that the faucet is in a position where cold water and hot water is mixed.

FIG. 6 shows that when moving the movable plate 5 to upper most position on the fixed plate 4, the adjusting recess 50 are in communication with both of the hot water inlet 43, cold water inlet 44 and the outlet 45 so that the water coming out from the outlet 45 is mixed with hot and cold water.

Figure 7:
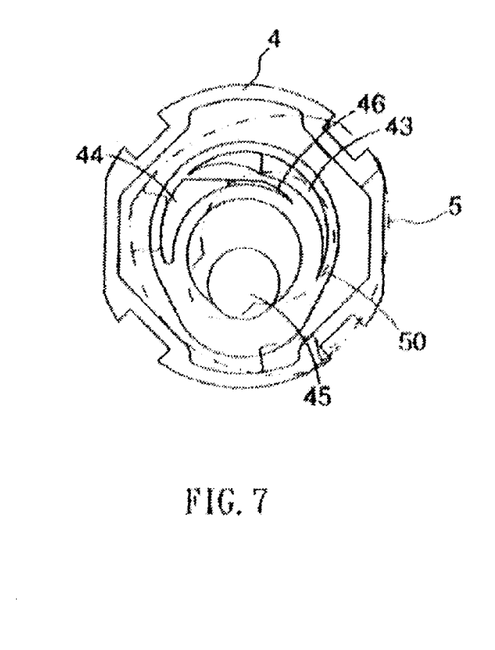
FIG. 7 shows that the faucet is in a position where cold water is less than hot water.

FIG. 7 shows that when rotating the movable plate 5 clockwise, the area of the hot water inlet 43 is larger than that of the cold water inlet 44 so that the temperature of the water coming out from the outlet 45 is higher. When the movable plate 5 is turned clockwise till the movable plate 5 cannot be rotated anymore, cold water can only flow via the slit 46 and is neglected when compared with hot water.

Figure 8:
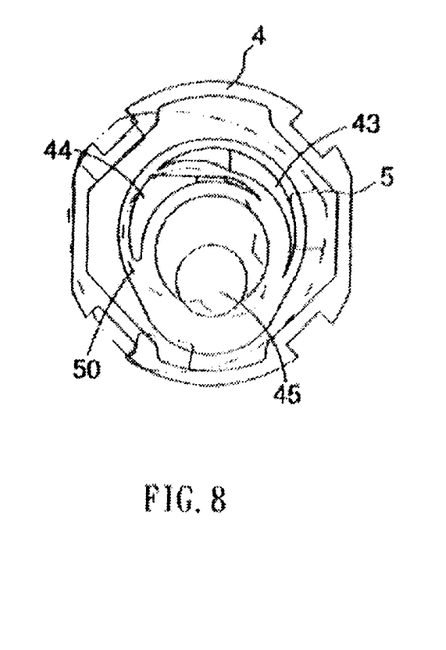
FIG. 8 shows that the faucet is in a position where cold water is much more than hot water.

As shown in FIG. 8, when rotating the movable plate 5 counter clockwise at the position where hot and cold water are mixed, the area of the hot water inlet 43 that is in communication with the adjusting recess 50 is reduced and the area of the cold water inlet 44 that is in communication with the adjusting recess 50 is increased, so that the temperature of the water coming out from the outlet 45 is reduced. When continuing rotating the movable plate 5 counter clockwise till the movable plate 5 cannot be rotated, only the cold water is allowed to flow out from the outlet 45. It is noted that as shown in FIG. 3, when operating the faucet to obtain hot water, a large friction is applied between the stop member 11 and the protrusion 25, so that the user has to apply a larger force to overcome the friction to have the hot water. This is a safety design to alert the user for hot water.

Figure 9:
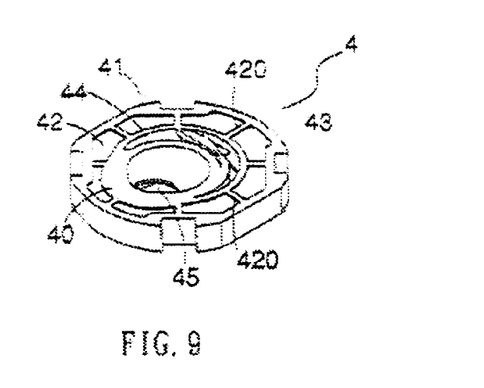
FIG. 9 shows the fixed plate of another embodiment of the faucet valve of the present invention.

FIG. 9 shows that a plurality of ribs 420 are located in the groove 42 so as to define the groove 42 into a plurality of receiving areas. A top surface of each rib 420 is in flush with the first and second flat surfaces 40, 41.

Figure 10:
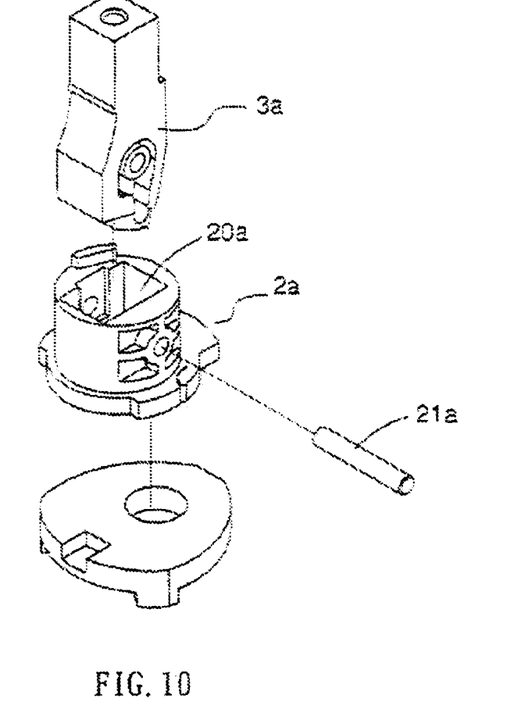
FIG. 10 is an exploded view to show yet another embodiment of the faucet valve of the present invention.

FIG. 10 shows another embodiment wherein the frame 2a includes a rectangular through hole 20a and the control rod 3a includes a rectangular cross section, the control rod 3a extending through the rectangular through hole 20a and a pin 21a extends through the frame 2a and the rectangular control rod 3a.

Figure 11:
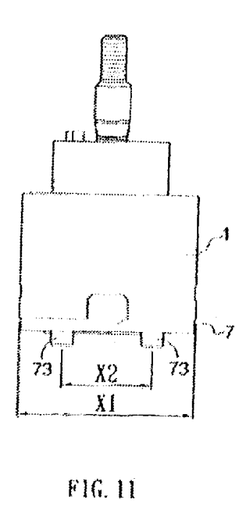
FIG. 11 shows the front view of the faucet valve of the present invention.
Figure 12:
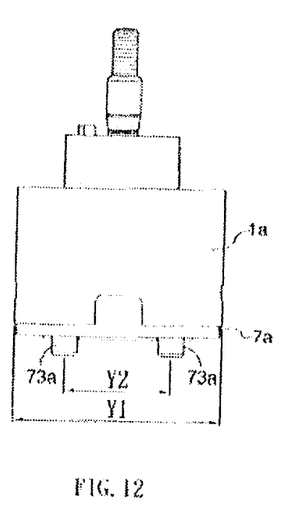
FIG. 12 shows the faucet valve of the present invention in different size.

FIG. 11 and 12 show that the faucet includes two different sizes, wherein the distance X2 between the two positioning rods 73 and the diameter of the body 1 in FIG. 11 are smaller than the distance Y2 between the two positioning rods 73a and the diameter of the body 1a. However, this requires two different sets of molds which are expensive.

Figure 13:
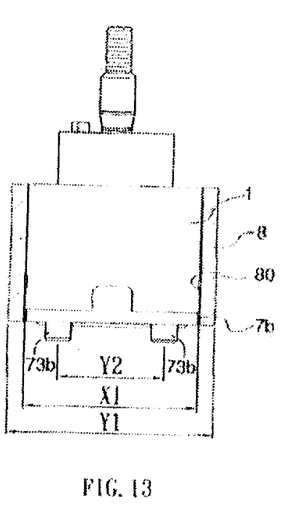
FIG. 13 shows a casing is used to the body of the faucet valve of the present invention.

FIG. 13 shows that a casing 8 encloses on the body 1 and has a tapered inner periphery 80 which becomes larger toward a lower end thereof and is convenient for mounting the casing 8 to the body 1. Therefore, the body 1 may receive the bottom plate 7b with two positioning rods 73b wherein the distance between the two positioning rods 73b is Y2. Although the diameter of the body 1 is X1, the diameter of the casing 8 is Y2. By this way, only the mold for the bottom plate 7b is needed.

While we have shown and described the embodiment in accordance with the present invention, it should be clear to those skilled in the art that further embodiments may be made without departing from the scope of the present invention.

What is claimed is:

1. A faucet valve comprising:

a body having a chamber defined in an underside thereof and a control rod extending through the chamber and the body;

a fixed plate fixed in said chamber, said fixed plate having a first flat surface defined in a raised portion at a center of said fixed plate, said fixed plate having a second flat surface defined in another raised portion at a periphery of said fixed plate and flush with said first flat surface, said first flat surface and said second flat surface defining a groove therebetween, said groove receiving grease therein, said first flat surface defining a hot water inlet and a cold water inlet and an outlet therethrough;

a movable plate mounted on said fixed plate, said movable plate having an adjusting recess defined in an underside thereof;

a control rod drivedly connected to said movable plate;

a frame rotatably received in said chamber of said body, said control rod being engaged with said frame so as to angularly rotate said frame; and a pair of stop members extending inwardly from an inner periphery of said chamber, said frame having a pair of wings extending from an outer periphery thereof, said pair of wings alternately contacting said pair of stop members when said frame is rotated, one of said pair of wings having a protrusion connected thereto, said protrusion and the wing from which said protrusion extends defining a gap therebetween.

2. The faucet valve of claim 1, further comprising:

a plurality of ribs located in said groove, a top surface of each rib of said plurality of ribs being flush with said first and second flat surfaces.

3. The faucet valve of claim 1, further comprising:

a bottom plate engaged with said chamber in said body, said bottom plate having three holes defined therethrough in communication respectively with said hot water inlet and said cold water inlet and said outlet.

4. The faucet valve of claim 1, further comprising:

a driving plate mounted on said movable plate, said driving plate having a central hole through which said control rod extends; and a plurality of clamping members extending from an underside of said driving plate and engaged with engaging recesses defined in said movable plate.

5. The faucet valve of claim 1, further comprising:

a slit defined in a separation portion between said hot water inlet and said cold water inlet.

6. The faucet valve of claim 1, further comprising:

a casing enclosing said body and having a tapered inner periphery which is enlarged at a lower end thereof.

7. The faucet of claim 1, said frame having a through hole having an hourglass-shaped inner periphery and an annular concave surface defined in a middle portion of said through hole, said control rod having a sphere portion which is rotatably retained within said annular concave surface, a notch defined in said inner periphery of said through hole, said control rod having a bar extending transversely therefrom and engaged with said notch.

8. The faucet of claim 1, said frame having a rectangular through hole, said control rod having a rectangular cross section, said control rod extending through said rectangular through hole and engaged with said frame by a pin.

* * * * *